US008377395B2

(12) United States Patent
Coleman

(10) Patent No.: US 8,377,395 B2
(45) Date of Patent: Feb. 19, 2013

(54) INTEGRATED BLOOD SPECIMEN PROCESSOR

(76) Inventor: Charles M. Coleman, Pittsburgh, PA (US)

( * ) Notice: Subject to any disclaimer, the term of this patent is extended or adjusted under 35 U.S.C. 154(b) by 21 days.

(21) Appl. No.: 13/097,975

(22) Filed: Apr. 29, 2011

(65) Prior Publication Data

US 2011/0266206 A1 Nov. 3, 2011

Related U.S. Application Data

(60) Provisional application No. 61/329,339, filed on Apr. 29, 2010.

(51) Int. Cl.
*B01D 35/05* (2006.01)

(52) U.S. Cl. .......... 422/533; 422/72; 422/548; 422/549; 210/121; 210/122; 210/242.1; 210/516; 210/789; 435/286.6; 494/16

(58) Field of Classification Search .................. 422/533; 210/122, 513, 541, 789
See application file for complete search history.

(56) References Cited

U.S. PATENT DOCUMENTS

| | | | | |
|---|---|---|---|---|
| 3,508,653 | A | | 4/1970 | Coleman |
| 3,780,935 | A | | 12/1973 | Lukacs et al. |
| 3,814,248 | A | | 6/1974 | Lawhead |
| 3,852,194 | A | | 12/1974 | Zine, Jr. |
| 3,931,018 | A | | 1/1976 | North, Jr. |
| 3,963,119 | A | | 6/1976 | Lukacs et al. |
| 4,152,270 | A | | 5/1979 | Cornell |
| 4,159,896 | A | | 7/1979 | Levine et al. |
| 4,877,520 | A | | 10/1989 | Burns |
| 4,946,601 | A | | 8/1990 | Fiehler |
| 5,065,768 | A | | 11/1991 | Coleman et al. |
| 5,236,604 | A | | 8/1993 | Fiehler |
| 5,560,830 | A | * | 10/1996 | Coleman et al. .............. 210/695 |
| 5,736,033 | A | | 4/1998 | Coleman et al. |

(Continued)

OTHER PUBLICATIONS

"Measurement of Hematological, Clinical Chemistry, and Infection Parameters from Hirudinized Blood Collected in Universal Blood Sampling Tubes" Seminars inn Thrombosis and Hemostasis, vol. 27, No. 4, 2001; Hans D. Menssen, M.D., Natascha Brandt, M.D., Rainer Leben, Frank Müller, Ph.D., Eckhard Thiel, M. D. And Karl Melber, Ph. D.

(Continued)

*Primary Examiner* — In Suk Bullock
*Assistant Examiner* — Timothy G Kingan
(74) *Attorney, Agent, or Firm* — Buchanan Ingersoll & Rooney PC

(57) ABSTRACT

A blood specimen processor by means of which blood specimens are collected into a collection tube containing an anticoagulant and a molded buoy of predetermined density between 1.045 and 1.084 with an embedded water swellable o-ring that expands to form a robust seal in a leucocyte density gradient between the buoy's outer surface and tube's inner surface. The buoy is made of a first resin and a second resin, the first resin having a lower density than the second resin, the first resin and the second resin being present in such amounts and relative proportions so that the body has an overall density between 1.045 and 1.084 and preferably, a center of gravity below a geometric center of the body. When the blood specimen contained in the processor is centrifuged, the buoy is thrust through the separating blood and the developing interface of erythrocytes, leucocytes, and plasma. A reproducible gradient develops that builds a reproducible buffy coat ring around the upper trough at the junction of the edge of the separator buoy and the tube wall. The relative proportions of resin are controlled to create a separator buoy of a desired density so that after centrifugation the buffy coat or other cells of interest will be above or below the water swellable o-ring.

23 Claims, 2 Drawing Sheets

U.S. PATENT DOCUMENTS

| | | | | |
|---|---|---|---|---|
| 6,479,298 | B1 * | 11/2002 | Miller et al. | 436/177 |
| 7,074,577 | B2 | 7/2006 | Haubert et al. | |
| 7,220,593 | B2 | 5/2007 | Haubert et al. | |
| 7,329,534 | B2 | 2/2008 | Haubert et al. | |
| 7,358,095 | B2 | 4/2008 | Haubert et al. | |
| 7,947,236 | B2 * | 5/2011 | Losada et al. | 422/527 |
| 2005/0109716 | A1 * | 5/2005 | Leach et al. | 210/787 |
| 2010/0155343 | A1 * | 6/2010 | Battles et al. | 210/789 |
| 2010/0288694 | A1 * | 11/2010 | Crawford et al. | 210/521 |

OTHER PUBLICATIONS

"The Use of Hirudin as Universal Anticoagulant in Haematology, Clinical Chemistry and Blood Grouping" Clin Chem Lab Med 2001:39(12): 1267-1277; Hans D. Menssen, M.D., Karl Melber, Ph.D., Natascha Brandt, and Eckhard Thiel, M. D.

* cited by examiner

FIG. 1
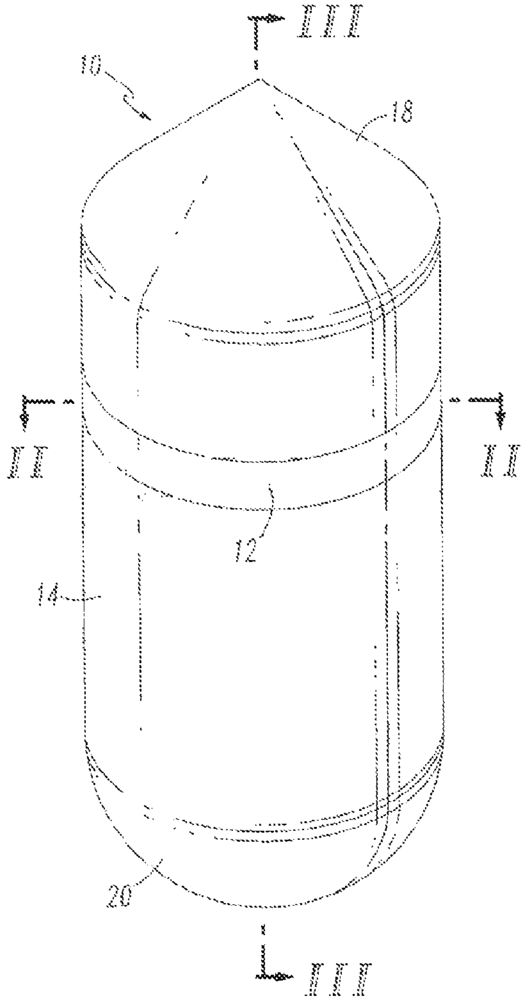
FIG. 2
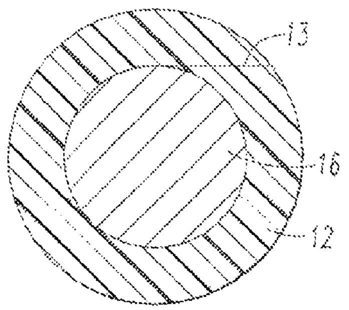
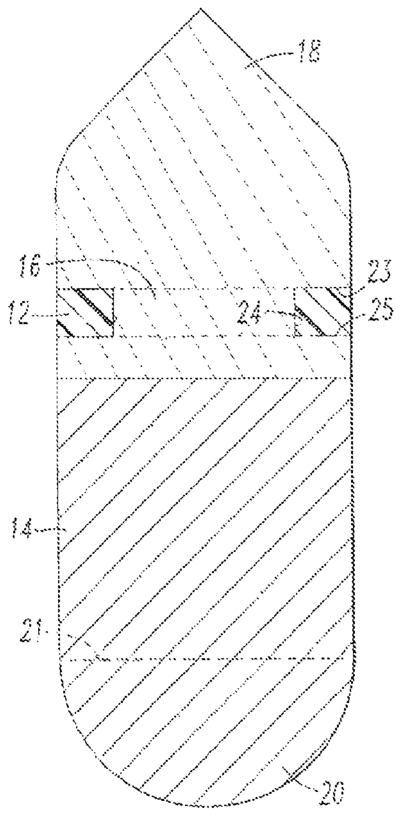
FIG. 3

INTEGRATED BLOOD SPECIMEN PROCESSOR

CROSS-REFERENCE TO RELATED APPLICATIONS

This application claims priority from U.S. Provisional application No. 61/329,339 filed Apr. 29, 2010, the entire subject matter thereof being incorporated herein by reference.

FIELD OF THE INVENTION

This invention is related to methods and apparatus to enable blood specimens to be collected, processed and separated safely and the cells and plasma are stabilized for personalized medicine and related activities.

BRIEF DESCRIPTION OF THE PRIOR ART AND BACKGROUND

Human blood is routinely collected in sealed, evacuated test tubes and centrifuged to separate the lighter serum or plasma portion from the heavier red blood cells. Typically a portion of the serum or plasma is then removed and tested. Today, much of the removal and testing is done by machines. While the separated blood is stored awaiting testing certain chemicals can migrate between the separated layers giving incorrect test results. Consequently, the art has developed a variety of separators having a specific gravity between the serum or plasma and the red blood cells. These separators are either solid devices or gels.

The first evacuated separator tube was sold by Becton Dickinson under the trademark Vacutainer®, invented by Joseph Kleiner in 1950. The next significant development is disclosed in my U.S. Pat. No. 3,508,653 licensed to Corning for a gel separator. But neither Becton Dickinson nor Corning could develop a functional evacuated solid separator tube for use with a blood specimen.

The critical failing in the attempt to develop a blood collection tube with solid separator was the inability to form and maintain a robust seal because maintaining glass tube's dimensions during the manufacturing process was virtually impossible. Greiner's introduction of molded barrier polyethylene terephthalate [PET] enabled matching of precision molded separator floats disclosed in my U.S. Pat. No. 5,736,033. The patent contains a review of the pertinent prior art up to April 1998.

In my U.S. Pat. No. 5,065,768 I disclose tubes with self-sealing plugs having an air vent channel which automatically seals a few seconds after the blood sample contacts the plug. The blood sample may then be dispensed with aid of a special pipette, or centrifuged in a microhematocrit or functionally similar centrifuge at about 11,000 g after collection of the fluid. This provides a packed cell volume reading, which may be followed by plasma dispensation from that tube. This invention is directed primarily toward the collection of blood from finger sticks, and discloses self-sealing plugs that seal off the air vent as a direct result of contact with the specimen at the time the sample is filled with blood from skin punctures. This invention does not relate to sealing devices that are intended to begin to seal during and after centrifugation has begun. Furthermore, the patent teaches that solid separators or gels are used to separate the phases of centrifuged blood.

My U.S. Pat. No. 5,736,033 discloses a solid separator which seals the separated blood phases in a blood collection tube. This device has a separator that has a specific gravity between the light and heavy phases of the blood, preferably between 1.03 and 1.06. The separator has a peripheral water swellable band generally flush and recessed within a molded body. The specific gravity of the separator is determined primarily by the specific gravity of the body, and to a lesser amount by the water swellable band. The body is a molded plastic material that may contain other material. For example, a magnetic separator can be constructed from a combination of a molded polypropylene component and iron or steel elements such that the separator has a specific gravity between 1.03 and 1.06.

The extensive use of high throughput analyzers and strong interest in biomarkers for the molecular diagnosis of disease has created a need for a simple, effective, and economical solid device for separation of plasma. This separator must have an overall density that assures the separator will always be positioned correctly for the formation of buffy coat rings used for genetic, microbiological, and other testing purposes as well as to aid collection of platelets used in coagulation studies such a separator should be formulated to have an overall specific gravity within a limited range. This makes the separator especially useful for automatic sampling machines and enables the rapid collection of specific cells of interest, particularly cells of the buffy coat and cells that have been marked with immuno-fluorescent dots, nanoparticles of various types, confocal, and confocal hyphenated systems, and various other tags. There is also a need for a solid separator to facilitate the harvesting of lymphocytes and monocytes in contemporary clinical laboratory testing for a multitude of immunological, genetic, microbiological, and other testing purposes as well as to aid collection of platelets and small white cells used in coagulation studies. Such a separator should be formulated to have an overall specific gravity within a limited range.

Contemporary cutting edge laboratories have an urgent need to reduce costs, and yet be able to analyze a diversity of blood specimens for a variety of tests. Hospital centers such as the University of Pittsburgh Medical Center, with their set of 24 affiliated hospitals and 4 core laboratories are now running millions of tests daily. Hospitals and laboratories that conduct tests on centrifuged blood such as ARUP Laboratories, one of the most advanced laboratories, have an immediate urgent need for a separator that can be used in blood collection tubes that are centrifuged such that after separation the buffy coat or other cells of interest will be at a known position in the tube and can be extracted with automated testing equipment. This separator must travel through the blood during centrifuging in a manner so that cells are not damaged. Finally, the separator must maintain a seal between the separated blood phases.

SUMMARY OF THE INVENTION

The present invention provides a solid separator buoy which seals the separated blood phases in a blood collection tube. The separator buoy has a body comprised of a first resin and a second resin, the first resin having a lower density than the second resin. The first resin and the second resin are present in such amounts and relative proportions so that the body has an overall density between 1.045 and 1.084 and a center of gravity below a geometric center of the body. A ring of water swellable material surrounds the body. This ring expands to create a seal between the separator and the blood collection tube separating the blood phases after centrifugation.

The body of the separator buoy is formed by carefully controlled injection of the resins into a mold such that the proportions of the resins in the body will create a separator having a desired overall density which is most appropriate for the type of cells to be collected. A density within the range 1.045 and 1.055 is preferred for collecting cells that have been marked with immuno-fluorescent tags. A density of from 1.064 to 1.084 is preferred for collection of buffy coat cells.

I prefer to make the body of the separator buoy by injecting lighter density resin into a mold to form the top or upper portion of the body. Then I inject a heavier resin to form the bottom or lower portion of the body. There may be a region between the top and bottom where the two resins are mixed together. Making the bottom of the body with the heavier resin will keep the separator aligned with the center axis of the tube during centrifuging. The heavier resin acts as a ballast that maintains the desired orientation of the separator buoy in the collection tube during centrifuging. After the resins have hardened or begun to cure I apply a ring of water swellable material around the body.

A similar separator buoy could be made using more than two resins, but such a product would be more expense to manufacture.

The separator buoy here disclosed is particularly suitable for use in collection tubes that are handled by automatic processing equipment, which centrifuge the tubes to separate the light phase from the heavy phase of blood previously collected and then withdraw some of the blood cells from the tube for further processing. When automatic probes are used to withdraw the cells from the blood collection tube, the position of the separator buoy relative to the cells of interest is critical because the probes are often programmed to go to a certain position within the tube where the cells of interest should be. That position is calculated based upon the dimensions of the tube, the dimensions and specific gravity of the separator and the amount of blood that has been placed in the tube.

The water swellable band or seal of this invention may be fabricated from the category of materials described in my U.S. Pat. No. 5,065,768 as super absorbent materials dispersed within an organic or silicone elastomer support matrix. Cross-linked hydrogels fabricated from hydrophilic acrylic and acrylamide monomeric components and certain polyether-amide or certain polyether urethane block copolymers are also suitable. Thermoplastic polyurethane elastomers containing superabsorbents may also be used, but they tend to be more expensive and ion-exchanging. The block copolymers of ethylene oxide with polyamides or polyurethanes are preferred because they can absorb water in amount from half to three times their weight, yet are non-ionic and thus will not affect the electrolyte values.

The assembly of the invention permits initial positioning of the separator buoy having a swellable band in the evacuated blood collection tube. Yet, the separator buoy does not become enmeshed in the coagulum during centrifugation, preventing its movement and emplacement between the two separated phases. In addition, the assembly of the invention provides for inhibition of premature actuation of the water swellable band, a frequent requirement for isolation of both plasma and serum light phases.

In the case where only plasma will be tested, the separator buoy may be located in the bottom of the tube, immersed in a bath of a relatively high specific gravity liquid so that the water swellable band is covered sufficiently to prevent blood collected by phlebotomy from coming into contact with it. The amount and specific gravity of the isolation liquid should permit both adequate immersion of the separator buoy, and sufficient coverage of the water swellable seal.

Other objects and advantages of the invention will become apparent from a description of present preferred embodiments shown in the drawings.

BRIEF DESCRIPTION OF THE FIGURES

FIG. 1 is a perspective view of a first present preferred embodiment of the separator buoy of the present invention.

FIG. 2 is a cross-sectional view taken along line II-II of FIG. 1.

FIG. 3 is a cross-sectional view taken along line III-III of FIG. 1.

DESCRIPTION OF THE PREFERRED EMBODIMENTS

Figure 4:
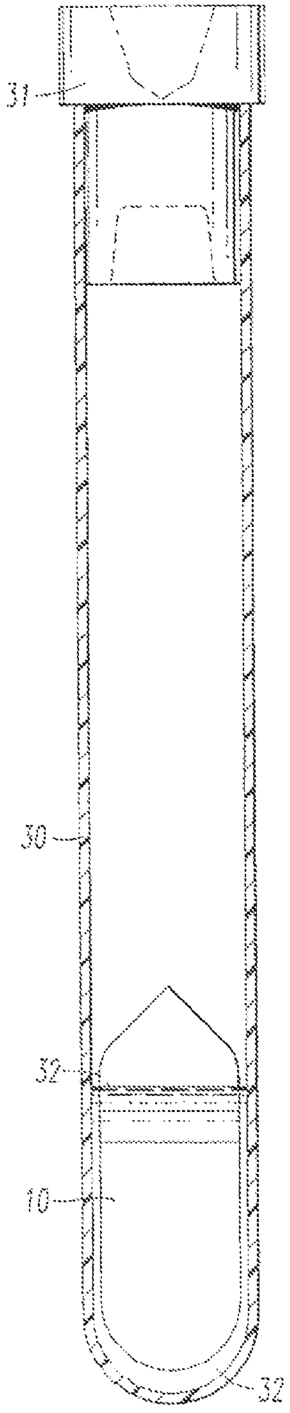
FIG. 4 is an elevational view of the separator buoy of FIG. 1 in a blood collection tube.

A first present preferred embodiment of the invention is shown in FIGS. 1 thru 3 in which the separator buoy 10 is shown to consist of a water swellable band 12 encircling the neck 16 of the separator body 14. The body of the separator buoy 10 has an upper or top portion 18 that preferably has a conical nose and a bottom or lower portion 14. The upper portion 18 is made of a first resin and the lower portion 14 is made of a second resin, the first resin having a lower density than the second resin. The first resin and the second resin are present in such amounts and relative proportions so that the body has an overall density between 1.045 and 1.084 and a center of gravity below a geometric center of the body. The first resin may be a styrene-acrylic copolymer and the second resin can be a different styrene-acrylic copolymer. Nova Chemical Company's copolymers designated Zylar 390, and 631, and NAS 21, 90, and 30, which correspond to densities 1.04, 1.05, 1.07, 1.08, and 1.09, can be molded in the form of the separator shown in the drawings. I prefer to use Zylar 390 resin as the lower density resin and NAS 30 as the higher density resin. Injection of the resin into a mold can be metered by a Programmable Logic Controller for a 3-shot injection molding tool to control the amount of each resin injected into the mold. This controller may cause higher density resin to be first injected into the base of the mold cavity, followed by injection of the lower density resin to cause the center of gravity to be below the geometrical center. If desired the lower density resin could be injected first. When the separator buoy 10 is placed in a blood collection tube 30 the conical nose will be directed toward the tube closure 31 as shown in FIG. 4. The overall specific gravity of the separator buoy is intermediate between the specific gravities of the light phase and the heavy phase of blood. When the overall density of the separator buoy is a specified quantity between 1.045 and 1.055, centrifugation of blood filled tubes thrusts the separator buoy on a coaxial trajectory enabling precision cytometry and hemolysis reduction. In this course there will be no shear against the wall causing cell rupture, and hemoglobinemia in the plasma. The use of two resins of different densities coupled with locating the center of gravity below the geometric center is responsible for the coaxial trajectory and absence of cell damage during centrifugation.

The water swellable band or o-ring 12 fits into a groove 24, which surrounds the neck 16. This groove may be V-shaped, concave or otherwise shaped, but I prefer the rectangular groove shown in the FIGS. 1 and 3. The band 12 may be a simple die cut having an outer diameter slightly less than the outer diameter of the separator body 14. This washer-like part is stretched over the nose 18 and positioned to encircle the neck 16. This water swellable washer-like band 12 will fit with slight clearance from the wall of groove 24 until it becomes exposed to the blood during centrifugation. When exposed to blood the band 12 starts to swell. The water swellable material can be polyether block copolymers of polyamides and polyether block copolymers of polyurethanes which will absorb water in amount ranging from one half to three times their weight. The preferred material from which to form the water swellable band 12 is a hydrophilic polyether-block-amide copolymer containing about equal weight percents nylon 6 and polyethylene glycol or polyethylene oxide ether. One such composition is sold by Atochem Arkem under the designation "PEBAX MX 1657". Alternatively, one could form the band by injecting the water swellable material into the mold containing the body of the separator buoy.

The separator main body segment is generally cylindrical, but it may have a slight to moderate taper. The base end 20, of the body may be flat, slightly conical, rounded or other shape. A hemispherical dome structure such as is shown in the drawings is appropriate for use with a molded round bottom plastic evacuated collection tube. The separator buoy is sized to fit within a blood collection tube. A separator buoy having a diameter of 8.9 mm and overall length of about 28 mm works well in a 13×100 mm plastic evacuated blood collection tube. The neck 16 is then about 4.5 mm in diameter. For this buoy the water swellable band 12 preferably has a 4.7 mm inside diameter and 8.7 mm outside diameter, and is 1.2 mm thick. The band 12 may be cut tangentially along line 13 from the inside to the outside to facilitate seating within the groove. When in place the band has about 0.02 mm clearance between band 12 and groove walls 23 and 25. Specification of the dimensions of the body of the separator buoy and the band affect the sealing rate of the separator buoy. A separator buoy about 12 mm in diameter and 20 mm long is usable in most of the larger diameter 16×100 mm, or 16×125 mm evacuated blood collection tubes.

For blood collection tubes used to collect a blood specimen that is to be tested for cells containing immuno fluorescent tags I prefer to provide a separator buoy that has an overall density in a range of between 1.045 and 1.055. Immuno fluorescent tags react specifically with tumor and pathogen epitope, and can be seen or detected using a microscope. Availability of microscopic cytometry provides a vast platform for diagnostic innovation and a new tool for cellular exploration.

The following is a list of examples of specific conditions which express surface antigens on target cells:

(1) Lymphocytes (target cells) which have been infected with HIV-1 will express a gp120 protein epitope on the surface of the infected cells within three days of having been infected. This expressed epitope can be detected with a solution containing fluorescently-tagged monoclonal antibodies, or other labeled binding materials, that are directed against the gp120 epitope, which solution is admixed with the whole blood sample.

2) Blood cells (target cells) which have been infected with CMV will express virus-specific glycoproteins and antigens of this herpes virus on the surface of the infected cells within one day of having been infected. These expressed antigens can be detected with a solution containing fluorescently-labeled monoclonal antibodies, or other labeled binding agents that are directed against the antigens in question, which solution is admixed with the whole blood sample.

(3) Lymphocytes (target cells) which have been infected with HCV will express various protein epitopes on the surface of the infected cells in patients with chronic HCV infection. These expressed epitopes can be detected with a solution containing a mixture of labeled monoclonal antibodies, such as 4,6E7-F6; 1,4G11-B4G10; 2C4G3; 22A5B12; and 20A6F3, for example, which are directed against the various HCV-specific epitopes, which solution is admixed with the whole blood sample.

(4) Lymphocytes which have been infected with EBV will express an EBV-specific antigen on the surface of the infected cells. This expressed antigen can be detected with a solution containing labeled B532 monoclonal antibodies that are directed against the expressed antigen, which solution is admixed with the whole blood sample.

(5) Mammalian blood cells contain Major Histo Compatibility (MHC) gene complexes which encode surface membrane antigens (epitopes) that are unique to the host blood donor. In human beings, lymphocytes and other blood cells express MHC gene complexes known as human leukocyte antigens ("HLA" epitopes). These epitopes are recognized by commercially available monoclonal antibodies. Foreign cells (target cells) can be identified in the host's blood when target cell epitopes are present which target cell epitopes differ from the host's unique surface epitopes. For example, a woman may have the HLA epitopes A2; A36; B22; B53; DR8; DR9; DQ1; and/or DQ4. If her mate's epitopic phenotype is A3; A36; B22; B59; DR1; DR10; or DQ2, then fetal cells can be detected and quantified in her blood during pregnancy by identifying circulating cells with any or all of the unique paternally-derived antigens (A3; B59; DR1; DR10; or DQ2). This information can be helpful in evaluating maternal fetal hemorrhage or in prenatal diagnostics where fetal cells are harvested for genetic analysis.

Similarly, if the woman in question were to receive a bone marrow transplant, donor cells could be identified and quantified in her blood by identifying circulating cells with unique donor antigens. The same procedure could be used for a male recipient. This information would be of value in assessing engraftment or organ transplant problems which are generally characterized as graft-vs-host disease. In graft-vs-host disease, the graft or transplant donor's leukocytes from the graft or transplant may multiply in the host's body to the extent that the donor's leukocytes will begin to attack the host's body and can cause health problems.

Haubert, Wardlaw, and Haubert's colleagues at the Battelle Institute in Columbus, Ohio have attempted to design and produce a blood collection device which is disclosed in U.S. Pat. Nos. 7,074,577, 7,220,593, 7,329,534, 7,358,095. Haubert's Tube and Buffy Coat Tube and Separator Systems which utilize density gradients, as the present invention does, are inferior, since they have no means to maintain a robust seal. Lack of an effective seal results in contamination of the buffy coat with hemoglobin from ruptured red cells on freezing. And obviously no means exists in this system to retrieve frozen buffy coat samples, aka "frozen aliquots".

I prefer to provide a separator having and overall density from 1.064 to 1.084, and more preferably between 1.065 and 1.082, in blood collection tubes used to collect a blood specimen that will be used in tests involving cells drawn from the buffy coat. An example of this could be the injection of two parts by weight of NAS 30 resin having a density of 1.09, and one part by weight Zylar 390 resin having a density of 1.04, to create a separator body having an integrated density of 1.07. Then I add the water swellable ring by injecting PEBAX MH 1657 around the separator body. This separator buoy can be used with Becton Dickinson's 13×75 mm PET evacuated blood collection tubes, or Greiner BioOne Vacuettes, tubes. Although I prefer to make the separator buoy from two resins of different density, one could use one or more additional resins. A filler or other material could be added to one or more of the resins when the separator is made.

FIG. 4 shows the separator buoy of FIG. 1 at the bottom of a plastic 13×100 mm evacuated plasma separator tube 30 having a conventional rubber stopper 31. The tube preferably contains an anticoagulant such as lithium heparin or r-hirudin, and is evacuated at the level of vacuum required to collect about 4.7 ml of blood. The use of r-hirudin as universal anticoagulant in hematology has been described in the literature. See for example Menssen H D, Melber K, Brandt N, Thiel, Clin Chem Lab Med. 2001 December; 39(12):1267-77 and "Measurement of Hematological, Clinical Chemistry, and Infection Parameters from Hirudinized Blood Collected in Universal Blood Sampling Tubes," Menssen H D, Brandt N, Leben R, Müller F, Thiel E, Melber K., Semin Thromb Hemost. 2001 August; 27(4):349-56. The text of these articles is incorporated herein by reference.

At the bottom of the tube there is a water-immiscible oil 32 with a specific gravity greater than that of the red blood cells. The oil's function is to isolate the water swellable band from the collected blood, and prevent activation of the water swellable band before centrifugation begins. There should be sufficient oil to maintain complete coverage of the top of the water swellable band 12 before centrifugation begins. Preferably the oil will extend a distance of 1.0 to 3.2 mm above the band 12. Polymethyl-3,3,3-trifluoropropylsiloxane fluid, 1000 centistokes viscosity and specific gravity 1.28, has been found to work excellently, although other suitable water-immersible oils such as polyesters of adipic acid and propylene glycol may be used. After blood is collected into an evacuated blood collection tube, and the blood has been sufficiently mixed with a selected anticoagulant contained therein, centrifugation begins. The oil remains in a small pool at the bottom of the collection tube, and the separator becomes centripetally displaced to the interface formed between the blood cells and the plasma. In a number of tests, centrifugation at 1200 g for 10 minutes gave good separation, emplacement, and isolation of the light and heavy phases of the blood. However, centrifugation of 1750 g was preferable, with faster and more clearly defined blood separation and separator emplacement.

The separator tubes may be made from glass or molded plastic. Plastics have become the materials of choice because neither mechanical nor thermal shock causes plastic tubes to break and transmit blood borne infections. Also, plastic tubes can be fabricated economically with excellent dimensional precision. Plastics tubes are less fragile than glass tubes permitting centrifugation at a much higher g force with concomitantly improved separations, and reduced centrifugation time required. When plastic is used rather than glass to construct the separator tubes of this invention, the separated phases may be frozen for archival storage without need for preliminary removal and transfer of the contents to separate storage vessels. The water swellable band can be modified readily to operate more rapidly, or more slowly, or to be used wherein the clearance between separator and tube wall is greater, or less than depicted here. These modifications to the composition and dimensions of the band can be readily made by those skilled in the art. The choice of materials and sizing will depend upon the requirements of the user, the operations of the blood handler, the collection tubes available, and marketing and manufacturing considerations. Examples of such considerations are the volume of blood to be collected; the form of the light phase (serum or plasma); g force available by the centrifuge to be used (the higher the g force the shorter the period needed to separate the blood phases and position the separator); type of centrifugation (horizontal or angle head); vacuum or non-vacuum collection tube; use of plastic (tapered wall) or glass (parallel wall) collection tube and the presence of other materials such as anticoagulants in the tube.

To obtain plasma all of the various configurations of the separator buoy can be used in tubes containing a variety of anticoagulants, including but not limited to ammonium, lithium, or sodium heparin salts. Even EDTA, or citrate may be used. To accelerate clotting to obtain serum, glass powder, silica, or other satisfactory siliceous particulate material may be used. Biologically derived clot inducers such as thrombin, prothrombin and certain snake venom derivatives may be added instead of siliceous particles to induce faster coagulation.

The separator buoy can be used in blood collection tubes to automate the sealing separation of the buffy coat and plasma from the erythrocytes, and has a density between plasma and red blood cells. A blood collection tube and separator buoy as described and shown in the drawings is provided. These tubes may be assembled with 3000 Units aqueous ultra-sonically sprayed Refludan Anti-Thrombin Units and 0.15 ml CP Hall polyglutamate, viscosity 10,000 centipoises to cover the water swellable ring. Push down separator buoy to the bottom of the tube and evacuate to 75 mm Hg. The tubes after evacuation should be centrifuged 10 minutes at 3000 RPM to remove air entrapped on wall of tubes. Blood should be collected in the standard way as prescribed by the collection tube manufacturer. The tubes should be rocked 6 to 8 times, then centrifuged for 15 minutes in a swing out rotor centrifuge at 5.000 G. When the centrifuged tubes are removed, the buffy coat will encircle the edge of the conical nose and break with the nose's edge. This method completely contains and automatically separates, transfers, and seals the buffy coat from the erythrocytes in a completely contained unit in which the separator has a density between circa 1.064 and 1.084.

The centrifuged collection tube can be used in cryopreservation of buffy coat concentrate before samples of frozen buffy coat and plasma aliquots are ordered, thus greatly reducing inventory. This is both contrary and preferable to having completely dispensed aliquots in the fully dispensed inventory, ready for use, as practiced by the UK Biobank, the world's largest blood repository. This practice is shown in slide 21 of a UK Biobank presentation, available at http://lab-robotics.org/Presentations/080228-UKBB_PEAKMAN/080228-UKBB_PEAKMAN.pdf The present invention enables control of separator performance which should result in improvement and maintenance of the quality of blood specimens, cryopreservation and use of frozen aliquotting technology for coring and retrieval of buffy coat and plasma. Gene expression, ribonucleic acid stabilization, leukocyte viability maintenance for molecular, immunological, and omic analysis is enabled by use of separators molded using a multishot injection tool, with ballast and density control selected by Programmable Logic Controller. Separator buoy types are selected by setting the PLC. At selected density settings between 4.5 and 5.5, the buffy coat will be beneath the water swellable seal. At a setting within 6.0 to 6.8, mononuclear cells probably predominate over the neutrophils, while between 7.5 to 8.4, neutrophils probably predominate over the mononuclear cells.

The buffy coat of blood specimens may be automatically separated, transferred and sealed when the blood specimens are collected in a PET blood collection tube containing r-hirudin, the thrombin inhibitor and the buffy coat. When the density of the separator buoy is in the range between 1.065 and 1.083, the buffy coat will be sealed and concentrated in the circular space above the water swellable ring and include the breaking peripheral edge of the nose. In this mode the erythrocytes are robustly sealed from the buffy coat.

However when the density of the separator buoy is between 1.045 and 1.055, the buffy coat is below the water swellable seal and the buffy coat can be analyzed cytometrically. This phenomenon is of particular interest because it appears suited to cytometry for immunofluorometry, EEG, CMV, and cancer cell detection.

The separator buoy may be molded with a two shot mold in which the separator buoy is molded according to the density of each selected resin. The use of a two shot mold or a three shot mold permits precise selection of any density from 1.045 to 1.085. Of particular value is the capability to provide precise ballast, permitting a coaxial trajectory and sealing. Coaxial sealing provides uniform equidistant thickness of the concentric wall between the outer surface of the separator and the inner surface of the PET tube. When the density of the separator buoy is between 1.045 and 1.055, that space can contain the buffy coat and in fact can contain leucocytes that may be stained so as to provide a cytological equivalent to flow cytometry. On this basis, simplified cytometry procedures may be developed.

Figure 5:
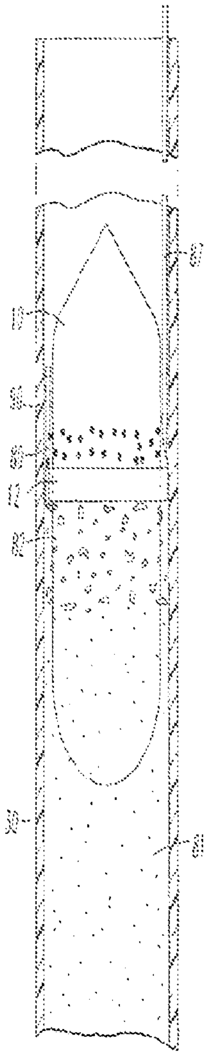
FIG. 5 is an elevational view of the separator buoy in a portion of a blood collection tube after the tube has been centrifuged and a probe has been inserted into the tube to remove selected cells.

To harvest lymphocytes/monocytes, blood is collected into an evacuated plastic tube of the type in FIG. 4, containing sufficient EDTA, or preferred anticoagulant, and centrifuged, preferably for 10 minutes at 1750 g, and the plasma is removed from the collection tube by decantation, transfer pipetting, or other appropriate means, after a firm seal has been made against the wall of the tube. At that point the collection tube 30 will appear as shown in FIG. 5. The lymphocytes and monocytes will form a band 80 along the wall of the separator buoy 10 above the packed erythrocytes and granulocytes 82, and above the water swellable band 12. The lymphocytes and monocytes may be withdrawn through a tubular needle-like probe 87 passing through the swollen band 12. A transfer channel may also be used to pass the cells carried in the irrigation stream of isotonic harvesting buffer. For this purpose a small cannula 90, as for example a ¾" 26 gauge hypodermic needle inserted with forceps through the band, diametrically opposite to the buffer injection side, or a small notch at the edge of the water swellable band prior to assembly into the evacuated plasma separator tube (e.g., a semi-circle of a radius 0.4 to 0.8 mm) serves well as an irrigation exit channel. Careful injection of a buffer solution, which has a specific gravity less than the mass of packed red cells/granulocytes 81 below the lymphocyte/monocyte band 80, will cause the cells to be washed up and out of the space between the separator and the inner wall of the collection tube, exiting through the passageway in the water swellable band into the empty space previously holding the removed plasma as shown in FIG. 5. From there these cells can then be drawn from the tube for testing.

The sharpness of definition of the boundary between erythrocytes/granulocytes and lymphocytes/monocytes may be improved by the inclusion of a barrier material (not shown), which may be either a sufficiently high viscosity Newtonian liquid separator material having a specific gravity between 1.065 to 1.077, or a thixotropic gel in the same specific gravity range, either of which can be substituted for the water-immiscible oil with a specific gravity less than the red cells which was covering the separator shown in FIG. 4. Such a commercially available Newtonian liquid is (79-82%)-dimethyl-(18-21%)-diphenylsiloxane copolymer, methoxy terminated, with a specific gravity 1.07, and viscosity of 650 to 700 centistokes. Examples of suitable gels for this purpose are described in Luderer et al. U.S. Pat. No. 4,190,535, which describes the formulations of gel-like oils to prepare the polymers with specific gravity ranging from 1.065 to 1.077 suitable for forming a viscous band between the packed erythrocytes/granulocytes and lymphocytes/monocytes. This band separating the cellular fractions diminishes the contamination by red cells/granulocytes of lymphocytes/monocytes pushed by the injected harvesting buffer solution into the emptied plasma compartment.

The lymphocytes, and monocytes will be below the water swellable band 12, when density 1.04 Zylar 390 and density 1.05 Zylar 631 are used to mold the body of the separator. Conversely, when the separators are molded with density 1.07 NAS 90, and 1.08 NAS 21 resin, the separators, lymphocytes, monocytes and granulocytes are concentrated above and upon the water swellable band 12 as shown in FIG. 5. In testing, NAS density 1.09 remained submerged below the packed erythrocytes, as expected and was of no value in providing a means to separate the leucocytes.

A separator buoy having a density of 1.05 could be used in separation of plasma with multiple myeloma proteins. This separator buoy could be molded by first injecting high density resin into the center bottom of the cavity 20% by weight, of density 1.09 resin, and into the upper cavity sector density 1.04 resin to fill it to make a separator having a density of 1.05, with ballast to provide a center of mass below the center of gravity so that it will track coaxially. A ballasted separator buoy of density 1.075 could be made from a first injection of 80% by weight: a resin of density 1.09, and a second injection of 20 weight %: a resin having a density of 1.04. A separator buoy having a density of 1.05 can be constructed to provide a precision sealed coaxial space to contain the buffy coat so that it may be observed and examined by a variety of precision peripheral microscopic means, including confocal, phase and Raman. Robust coaxial parallel spacing between the separator buoy outer surface and the tube's inner wall could provide the platform for optical observation of rare cells at a cost advantage over flow cytometry.

Figure 6:
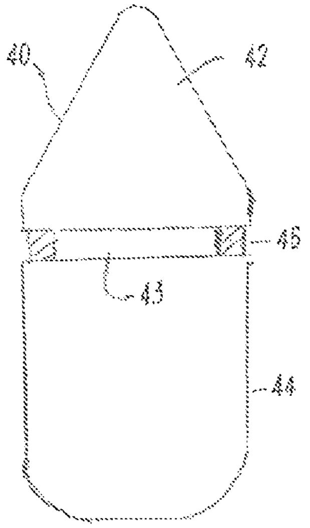
FIG. 6 is a perspective view of a second present preferred embodiment of my separator buoy.

A second present preferred embodiment of my separator buoy 40 is shown in FIG. 6. This separator buoy 40 has a body with an upper conical portion 42, a bottom portion 44 and center portion 43 having a smaller diameter than the bottom portion. A water swellable band 46 is provided around the center portion. The upper portion 42 is formed from lower density resin, such as a styrene-acrylic copolymer. The lower portion 44 is formed of a higher density resin preferably a different styrene-acrylic copolymer. The center portion 43 can be made of either resin. This embodiment preferably is made in a mold by a coinjection of the selected resins. As in the first embodiment the center of gravity will be below the geometric center of the body.

The two shot or three shot injection molding system can be readily fine tuned to precisely control the injection ratios of a higher density, and a lower density resin into a cavity to mold separator buoy that will move in a precise coaxial trajectory path to an equilibrium sealing position in a cellular gradient so the buffy coat of the blood may be positioned below the water swellable seal, enabling cytometry and microscopic observations and measurements. This positioning provides a platform for immunologic cytometry below the water swellable seal and enables molecular diagnostic testing. Consequently, there can be set of blood collection tubes each having a separator buoy of a different overall density such that one tube from the set is used for each type of testing to be performed. This method of manufacture also enables the separator buoy to be made to have ballast, or a heavier portion at the bottom of the separator buoy which provides for coaxial trajectory and non-shear of cells during centrifuging. Additionally, the resins available from Nova Chemical and others are FDA approved for use in blood collection products.

The present invention also permits completely automated, manufacture of evacuated blood collection tubes at low cost and free of nucleic acid contamination. The blood collection tube and separator buoy assembly here disclosed can be used for automatic cell separation, transfer, sealing, and cryopreservation of circulating and cord blood, plasma, and buffy coat. Since multiple tests samples can be taken from a single tube of collected blood, fewer blood samples can be drawn per patient thereby providing patient comfort and reducing the opportunity for tracking and misidentification errors. Fewer blood sampling tubes drawn per patient reduces iatrogenic anemia, pain, and anxiety, especially among enfeebled elderly patients and infants.

The present invention also permits direct rapid separation of RNA and plasma proteins, in 15 minutes or less. Then the separated blood can be snap frozen without the use of a stabilizer.

Although I have shown and described certain present preferred embodiments of my separator buoy, blood collection tube and methods of using the device, it should be distinctly understood that the invention is not limited thereto, but may be variously embodied within the scope of the following claims.

I claim:

1. A separator buoy for use in a fluid collection tube which has at least one inner wall which defines a cavity for containing fluid, the separator comprised of:

a body sized and shaped to fit within the cavity and provide a fluid passage between the body and the inner wall, the body comprised of a first resin and a second resin, the first resin having a lower density than the second resin, the first resin and the second resin being present in such amounts and relative proportions so that the body has an overall density between 1.045 and 1.084 and a center of gravity below a geometric center of the body; and a water swellable material attached to the body, the water swellable material being sized and positioned so that when the separator buoy is placed within the cavity and exposed to water containing fluid the water swellable material will swell so as to seal the fluid passage.

2. The separator buoy of claim 1 wherein the body has a circumferential groove and the water swellable material is within the circumferential groove and swells to a greater diameter which is larger than a diameter of the body.

3. The separator buoy of claim 1 wherein the water swellable material is comprised of a material selected from the group consisting of superabsorbent materials being dispersed in a support matrix comprised of at least one of a silicone elastomer, an organic elastomer, vulcanized rubber containing a superabsorbent, thermoplastic polyurethane containing a superabsorbent, and cross-linked hydrogels.

4. The separator buoy of claim 1 wherein the water swellable material has the property of not swelling while isolated from water by oil.

5. The separator buoy of claim 4 wherein the oil has a specific gravity such that after centrifugation of the fluid collection tube containing the separator and the oil, the oil will be below the water swellable material.

6. The separator buoy of claim 1 wherein the water swellable material is comprised of a material selected from the group consisting of polyether block copolymers of polyamides and polyether block copolymers of polyurethanes which will absorb water in amounts ranging from one half to three times their weight.

7. The separator buoy of claim 6 wherein the polyether block copolymer is a polyether block amide copolymer containing about equal parts nylon 6 and polyethylene oxide ether.

8. The separator buoy of claim 1 wherein the body also comprises a conical top.

9. The separator buoy of claim 1 also comprising a hemispherical bottom.

10. The separator buoy of claim 1 wherein the body has an overall density of from 1.045 to 1.055.

11. The separator buoy of claim 1 wherein the body has an overall density of from 1.055 to 1.065.

12. The separator buoy of claim 1 wherein the body has an overall density of from 1.065 to 1.084.

13. The separator buoy of claim 1 wherein the separator buoy has an upper portion and a lower portion, the upper portion containing the first resin and the lower portion containing the second resin.

14. A separator buoy for use in a fluid collection tube which has at least one inner wall which defines a cavity for containing fluid, the separator comprised of:

a body sized and shaped to fit within the cavity, the body comprised of a first resin and a second resin, the first resin having a lower density than the second resin, the first resin and the second resin being present in such amounts and relative proportions so that the body has an overall density between 1.045 and 1.084 and a center of gravity below a geometric center of the body;

wherein the first resin is styrene-acrylic copolymer and the second resin is a different styrene-acrylic copolymer.

15. A fluid collection tube, comprising:

a. a tubular body closed at both ends and having an inner wall which defines a cavity for containing fluid; and b. a separator buoy comprised of:

a body sized and shaped to fit within the cavity, the body comprised of a first resin and a second resin, the first resin having a lower density than the second resin, the first resin and the second resin being present in such amounts and relative proportions so that the body has a density between 1.045 and 1.084 and a center of gravity below a geometric center of the body, and a water swellable material surrounding the body, such that a water containing fluid passing over the water swellable material will cause the water swellable material to swell toward and against the inner wall of the tubular body creating a seal between the separator and the inner wall of the tubular body.

16. The fluid collection tube of claim 15 wherein the body has a circumferential groove and the water swellable material is within the circumferential groove and swells to a greater diameter which is larger than a diameter of the body.

17. The fluid collection tube of claim 15 wherein the separator has an overall density of from 1.045 to 1.055.

18. The fluid collection tube of claim 15 wherein the separator has an overall density of from 1.055 to 1.065.

19. The fluid collection tube of claim 15 wherein the separator has an overall density of from 1.065 to 1.084.

20. The fluid collection tube of claim 15 wherein the separator body has an upper portion and a lower portion, the upper portion containing the first resin and the lower portion containing the second resin.

21. The fluid collection tube of claim 15 wherein the first resin is styrene-acrylic copolymer and the second resin is a different styrene-acrylic copolymer.

22. A blood specimen processing tube, comprising:

a. a molded tubular body closed at both ends and having an inner wall with a slight mold release, taper;

b. a high affinity, high specificity anticoagulant within the tubular body, and c. a separator buoy comprised of:

a body sized and shaped to fit within the cavity, the body comprised of a first resin and a second resin, the first resin having a lower density that the second resin, the first resin and the second resin being present in such amounts and relative proportions so that the body has a density between 1.045 and 1/084 and a center of gravity below and axial to the true geometric center of the buoy, and a water swellable material surrounding the body, such that a water containing fluid passing over the water swellable material will cause the water swellable material to swell toward and against the inner wall of the tubular body creating a seal between the separator and the inner wall of the tubular body.

23. The blood specimen processing tube of claim 22 wherein the anticoagulant is r-hiridin.

* * * * *